United States Patent [19]

Yamamoto et al.

[11] Patent Number: 4,898,918
[45] Date of Patent: Feb. 6, 1990

[54] THERMOPLASTIC RESIN COMPOSITION

[75] Inventors: Naoki Yamamoto; Hiroshi Mori, both of Hiroshima; Akira Nakata, Otake; Misayo Suehiro, Hiroshima, all of Japan

[73] Assignee: Mitsubishi Rayon Co., Ltd., Tokyo, Japan

[21] Appl. No.: 251,464

[22] Filed: Sep. 30, 1988

[30] Foreign Application Priority Data

Oct. 1, 1987 [JP] Japan ................. 62-245921

[51] Int. Cl.$^4$ ........................... C08F 283/04
[52] U.S. Cl. ................... 525/425; 525/431
[58] Field of Search ............... 525/425, 531

[56] References Cited

U.S. PATENT DOCUMENTS

| | | | |
|---|---|---|---|
| 3,847,867 | 11/1974 | Heath et al. | 528/15 |
| 3,847,869 | 11/1974 | Williams, III | 528/128 |
| 4,386,174 | 5/1983 | Cogswell et al. | 525/425 |
| 4,387,193 | 1/1983 | Gilles, Jr. | 525/431 |
| 4,687,819 | 8/1987 | Quinn et al. | 525/425 |

Primary Examiner—Melvyn I. Marquis
Attorney, Agent, or Firm—Oblon, Spivak, McClelland, Maier & Neustadt

[57] ABSTRACT

There is disclosed a thermoplastic resin composition comprising a polyether imide resin (A) and an aromatic polyester-polyorganosiloxane block copolymer (B), the weight ratio of A to B (A/B) being 1/9 to 9/1.

11 Claims, No Drawings

THERMOPLASTIC RESIN COMPOSITION

FIELD OF THE INVENTION

The present invention relates to a thermoplastic resin composition which is excellent in impact resistance, heat resistance, mechanical strength, moldability, fludity, etc., and more particularly it relates to a thermoplastic resin composition comprising a polyether imide resin and a specific aromatic polyester-polyorganosiloxane block copolymer.

DISCUSSION ON RELATED ART

Polyether imide resins are excellent in heat resistance, mechanical strength, etc. Moreover, they have recently been noted as resins having an excellent processability, and their application is being broadened.

The polyether imide resins, however, are insufficient in impact resistance, and particularly when an impact is given to a notched test specimen of the resin, the strength of the test specimen is extremely lowered. Therefore, special care should be taken in determining the shape of a molded article of the resin.

As methods for improving the impact resistance of polyether imide resins, there have been disclosed a method of blending a polyolefin fluoride (publicized in Jap. Offic. Pat. Gaz. No. 60-501006), a method of blending a polyacrylate elastomer (Jap. Pat. application Kokai (Laid-Open) No. 60-127361), a method of blending a styrene-butadiene block copolymer (Jap. Pat. application Kokai (Laid-Open) No. 60-156753, a method of blending a rubber-modified vinyl aromatic polymer (publicized in Jap. Offic. Pat. Gaz. No. 60-501010), etc. All of these methods, however, have defects, for example, low compatibility of each blended polymer with polyether imide resins, and low weather resistance and heat resistance of the resulting blends. Therefore, according to these methods, polyether imide resins cannot be improved in impact resistance while retaining their advantages sufficiently.

SUMMARY OF THE INVENTION

The present invention is intended to improve the impact resistance of a polyether imide resin while keeping its intrinsic excellent heat resistance and mechanical strength intact.

In order to achieve the above object, the present inventors have devoted themselves to research and consequently found that by blending an aromatic polyester-polyorganosiloxane block copolymer with a polyether imide resin, there can be obtained a resin composition which is good in compatibility of the resin components with each other, gives a molded article free from exfoliation, has a greatly improved impact resistance, and is excellent in heat resistance and mechanical strength as well as in processability and fluidity, whereby the present invention has been accomplished.

DETAILED DESCRIPTION OF PREFERRED EMBODIMENTS

That is, the thermoplastic resin composition of the present invention comprises a polyether imide resin (A) and an aromatic polyester-polyorganosiloxane block copolymer (B) and is characterized in that the weight ratio of A to B (A/B) is 1/9 to 9/1.

In the composition of the present invention, the weight ratio between the two components, i.e., A/B, is 1/9 to 9/1, and when the weight ratio is outside this range, the heat resistance and impact resistance characteristic of the composition of the present invention would be impaired. Therefore, it is not desirable.

The polyether imide resin (A) used in the present invention consists preferably of recurring units represented by the formula:

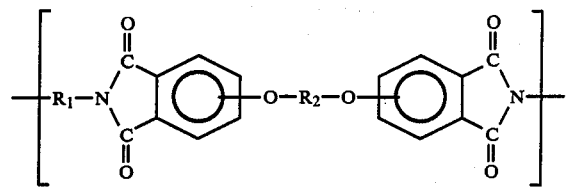

wherein $R_1$ and $R_2$ are independently a divalent organic group.

The divalent organic groups represented by $R_1$ and $R_2$ include, for example, substituted and unsubstituted phenylene groups, and groups represented by the formula:

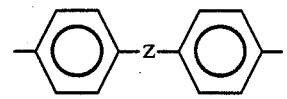

in which Z is an oxygen atom, a sulfur atom,

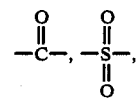

or an alkylene group having 5 or less carbon atoms.

The substituents on the phenylene group are lower alkyl groups, halogenated lower alkyl groups, halogen atoms, etc., including, for example, methyl group, ethyl group, bromomethyl group, chlorine atom and bromine atom.

The alkylene group having 5 or less carbon atoms includes, for example, methylene group, ethylene group, 2,2-propylene group, 1,2-butylene group, 2,2-butylene group, 2,2-pentene group, 3,3-pentene group, and 1,1- or 2,2-dimethylethylene group.

More preferably, $R_1$ is a 1,3-phenylene group and $R_2$ is

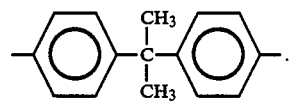

The aromatic polyester-polyorganosiloxane block copolymer (B) used in the present invention is a block copolymer of an aromatic polyester and a polyorganosiloxane.

This aromatic polyester-polyorganosiloxane block copolymer (B) consists of units of the aromatic polyester and units of the polyorganosiloxane, and the weight ratio of the aromatic polyester to the polyorganosiloxane is preferably 9:1 to 1:9. The number average molecular weight of aromatic polyester segment is preferably 1800 or more. When it is less than 1800, the function of the aromatic polyester segment as a segment compatible with the polyether imide tends to be deteriorated, resulting in deterioration of physical properties of the composition. Therefore, such a number average molecular weight is not desirable. The number average molecular weight of polyorganosiloxane segment is preferably 700 or more. When it is less than 700, the elasticity tends to be lowered, resulting in deterioration of physical properties of the composition. Therefore, such a number average molecular weight is not desirable.

The aromatic polyester is preferably one which comprises, as its main constituent, an aromatic polyester (I) comprising an aromatic dicarboxylic acid(s) and a dihydric phenol(s), an aromatic polyester (II) comprising an aromatic dicarboxylic acid(s) and a lower aliphatic diol(s) or an alicyclic diol, an aromatic polyester (III) comprising an aromatic hydroxycarboxylic acid(s), or an aromatic polyester (IV) comprising two or more copolymers selected from (I), (II) and (III).

The aromatic dicarboxylic acid(s) used in the present invention is represented by the formula;

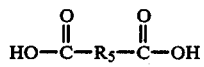

wherein $R_5$ is a substituted or unsubstituted phenylene group, a group represented by the formula

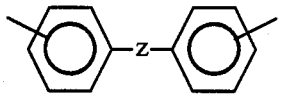

(in which Z is a direct link, —$CH_2$ or

or a naphthylene group. The substituent on the phenylene group includes, for example, chlorine atom, bromine atom, and methyl group. The substituted phenylene groups can have 1 to 4 substituents in number. The aromatic dicarboxylic acid(s) for making up the aromatic polyester includes, for example, terephthalic acid, isophthalic acid, diphenyl-m,m'-dicarboxylic acid, diphenyl-p,p'-dicarboxylic acid, diphenylmethane-m,m'-dicarboxylic acid, diphenylmethane-p,p'-dicarboxylic acid, benzophenone-4,4'-dicarboxylic acid, and naphthalenedicarboxylic acid. These compounds can be used alone or as a mixture thereof. Aliphatic dicarboxylic acids such as adipic acid, sebacic acid, and the like may be used in a small amount in admixture with the aromatic dicarboxylic acid.

The dihydric phenol(s) includes, for example, hydroquinone, resorcinol, dihydroxynaphthalene, biphenol, 1,8-dihydroxyanthraquinone, and dihydric phenols represented by the formula

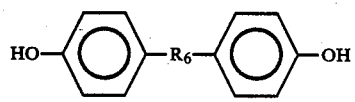

(wherein $R_6$ is an oxygen atom, a sulfur atom

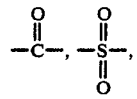

or an alkylene group having 5 or less carbon atoms which is optionally substituted by halogen atoms), such as 2,2-bis(4-hydroxyphenyl)propane (bisphenol A), 4,4'-dihydroxydiphenylsulfone, 4,4'-dihydroxydiphenyl ether, 4,4'-diphenyl sulfide, 4,4'-dihydroxydiphenyl ketone, 4,4'-dihydroxydiphenylmethane, 1,1-bis(4-hydroxyphenyl)-ethane, 1,1-bis(4-hydroxyphenyl)-2-butane, 1,1-bis(4-hydroxyphenyl)-2,2,2-trichloroethane, and the like. These compounds may be used alone or as a mixture thereof.

The lower aliphatic diol(s) or the alicyclic diol(s) is represented by the formula:

wherein $R_7$ is a lower alkylene group or an alicyclic alkylene group. Preferable examples of the lower aliphatic diol(s) are alkylene diols having 2 to 6 carbon atoms, for example, ethylene glycol, propylene glycol, 1,4-butanediol, 1,5-pentanediol, and 1,6-hexanediol. Preferable examples of the alicyclic diol(s) are alicyclic diols having 15 or less carbon atoms, for example, cyclohexanediol and cyclohexanedimethanol. These lower aliphatic diols or alicyclic diols may be used alone or as a mixture thereof. Among them, ethylene glycol, 1,4-butandiol, or cyclohexanedimethanol is preferred.

The aromatic hydroxycarboxylic acid(s) includes, for example, m-hydroxybenzoic acid, p-hydroxybenzoic acid, 1-hydroxy-6-naphthoic acid, 2-(4'-hydroxyphenyl)-2-(4'-carboxyphenyl)-propane, and 4-hydroxyphenyl-4-carboxyphenyl ether. These compounds may be used alone or as a mixture thereof.

As preferable aromatic polyester segments, there may be exemplified aromatic polyesters comprising terephthalic acid and 1,4-butanediol, aromatic polyesters comprising a terephthalic acid-isophthalic acid mixture and 2,2-bis(4-hydroxyphenyl)propane, copolymers of p-hydroxybenzoic acid and 6-hydroxy-2-naphthoic acid, copolymers of p-hydroxybenzoic acid, 2,6-naphthalenedicarboxylic acid and 2,6-naphthalenediol, copolymers of p-hydroxybenzoic acid, 2,6-naphthalenedicarboxylic acid, resorcinol and isophthalic acid, etc.

The polyorganosiloxane includes polydimethylsiloxanes, polydiphenylsiloxanes, polymethylphenylsiloxanes, poly(dimethylsiloxane-diphenylsiloxane)s, etc., and is preferably a polydimethylsiloxane.

In the polyorganosiloxane segment which is represented by the formula:

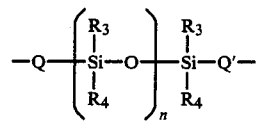

wherein $R_3$ and $R_4$ are independently a methyl group or a phenyl group, Q and Q' are independently a divalent organic group, and n is an integer of 10 or more, Q which is the binding portion to the aromatic polyester segment, is an oxygen atom,

or —O—R$_9$— (in which R$_8$ and R$_9$ are independently a lower alkylene group or a lower alkylene ether group), and Q' is an oxygen atom,

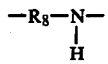

or —R$_9$—O— (in which R$_8$ and R$_9$ are as defined above). The lower alkylene groups represented by R$_8$ and R$_9$ are alkylene groups having 2 to 6 carbon atoms, for example, ethylene group, trimethylene group, tetramethylene group, pentamethylene group, hexamethylene group, 1,2-butylene group, 1,3-butylene group, 2,3-butylene group, and 1,1- or 2,2-dimethylethylene group. The lower alkylene ether group includes,

—CH$_2$—CH$_2$—O—CH$_2$—CH$_2$—,

—CH$_2$—CH$_2$—CH$_2$—O—CH$_2$—CH$_2$—,

—CH$_2$—CH$_2$—CH$_2$—O—CH$_2$—CH$_2$—CH$_2$—,

—CH$_2$—CH(CH$_3$)—O—CH$_2$—CH$_2$—,

—CH$_2$—CH(CH$_3$)—CH$_2$—O—CH$_2$—CH$_2$—,

—CH$_2$—CH(CH$_3$)—O—CH(CH$_3$)—CH$_2$— etc., and is preferably —CH$_2$)$_3$—O—(CH$_2$)$_2$ or a trimethylene ether group.

The polyether imide resin (A) and the aromatic polyester-polyorganosiloxane block copolymer (B) used in the present invention can be produced, for example, in the following ways.

The polyether imide resin (A) can be produced according to the method described, for example, in the specifications of U.S. Pat. Nos. 3847867, 3847869, 3850885, 3852242, and 3855178.

The aromatic polyester-polyorganosiloxane block copolymer can be produced by a method properly selected from for example, conventional melt condensation polymerization, solution condensation polymerization, and interfacial condensation polymerization methods, depending on the constituents of the aromatic polyester and the functional group of the polyorganosiloxane.

For example, a block copolymer of a polydimethylsiloxane having an alkylamine group at the end and an aromatic polyester can be produced by a method according to ACS. polym prop (1983) or 30th National SAMPE Symposium Mar. 19-21, 1985. A block copolymer of a polydimethylsiloxane having a dimethylamine group at the end and an aromatic polyester can be produced by a method according to Ind. Eng. Chem. Prod. Res. Develop., Vol. 12, No. 4, 1973, TRANSACTIONS OF THE SOCIETY OF PHEOLOGY 21:2, 273-290, Applied Polymer Symposium No. 22, 143-156 (1973), or 30th National SAMPE Symposium Mar. 19-21, 1985. The aromatic polyester-polyorganosiloxane block copolymer can be produced also by a method comprising reacting a polyorganosiloxane having a diol group at the end, an aromatic dicarboxylic acid dihalide and a dihydric phenol with one another at 50° C. or lower in an organic halogenated solvent such as chloroform by the use of a tertiary amine such as pyridine as a dehydrochlorinating agent, or a method comprising subjecting monomers for making up an aromatic polyester or an aromatic polyester and a polyorganosiloxane having a diol group at each end represented by the formula:

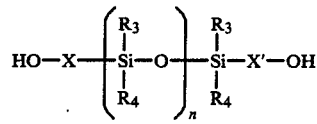

wherein R$_3$ and R$_4$ are independently a methyl group or a phenyl group, X and X' are independently a lower alkylene group or a lower alkylene ether group or a direct linkage, and n is an integer of 10 or more to melt condensation polymerization in the presence of a catalyst for ester interchange. Any of the methods described above may be used.

The thermoplastic resin composition of the present invention can be prepared by the use of the polyether imide resin (A) and the aromatic polyester-polyorganosiloxane block copolymer (B), for example, in the following manner.

The component (A) and the component (B) are mechanically mixed in a predetermined ratio in a conventional apparatus such as Banbury mixer, extruder, or the like, and extruded into pellets.

In this case, stabilizers, plasticizers, lubricants, flame retarders, pigments, fillers, etc. may, if necessary, be incorporated in addition to the components (A) and (B).

EXAMPLES

The present invention is further illustrated with the following examples.

Of properties of the compositions evaluated in the examples, Izod impact strength was ⅛-inch notched Izod impact strength measured at 23° C. in accordance with ASTM D256, and thermal deformation temperature was measured in accordance with ASTM D648.

Synthetic Example 1

Into a reactor equipped with a stirrer were charged 0.5 kg of a polydimethylsiloxane having a diol group at each end (number average molecular weight: 3200) represented by the formula:

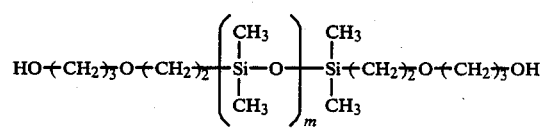

0.16 kg of terephthalic acid chloride and 0.16 kg of isophthalic acid chloride, and 6.0 kg of chloroform was added to obtain a homogeneous solution. In a mixed solvent of 2.0 kg of chloroform and 0.3 kg of pyridine was dissolved 0.32 kg of bisphenol A to obtain a homogeneous solution, which was then added to the above-mentioned solution which had been cooled to 0° C.

After stirring for 7 to 8 hours, the reaction solution was taken out, washed with diluted hydrochloric acid and water, and poured into methanol to carry out reprecipitation, and the precipitate formed was dried to obtain 0.95 g of an aromatic polyester-polyorganosiloxane block copolymer (S-1) (number average molecular weight: 45000).

Synthetic Example 2

By the same method as in Synthetic Example 1, except that the amounts of the polydimethylsiloxane having a diol group at each end (number average molecular weight: 3200), terephthalic acid chloride, isophthalic acid chloride, bisphenol A and pyridine were changed to 0.3 kg, 0.21 kg, 0.21 kg, 0.45 kg and 0.37 kg, respectively, 0.95 kg of an aromatic polyester-polyorganosiloxane block copolymer (S-2) (number average molecular weight: 50000) was obtained.

Synthetic Example 3

By the same method as in Synthetic Example 1, except that the amounts of the polydimethylsiloxane having a diol group at each end (number average molecular weight: 3200), terephthalic acid chloride, isophthalic acid chloride, bisphenol A and pyridine were changed to 0.1 kg, 0.27 kg, 0.27 kg, 0.59 kg and 0.49 kg, respectively, 0.95 kg of an aromatic polyester-polyorganosiloxane block copolymer (S-3) (number average molecular weight: 49000) was obtained.

Synthetic Example 4

By the same method as in Synthetic Example 1, except that the amounts of the polydimethylsiloxane having a diol group at each end (number average molecular weight: 3200), terephthalic acid chloride, isophthalic acid chloride, bisphenol A and pyridine were changed to 0.7 kg, 0.11 kg, 0.11 kg, 0.19 kg and 0.16 kg, respectively, 0.95 kg of an aromatic polyester-polyorganosiloxane block copolymer (S-4) (number average molecular weight: 42000) was obtained.

Synthetic Example 5

By the same method as in Synthetic Example 1, except that the amounts of the polydimethylsiloxane having a diol group at each end (number average molecular weight: 3200), terephthalic acid chloride, isophthalic acid chloride, bisphenol A and pyridine were changed to 0.9 kg, 0.06 kg, 0.06 kg, 0.07 kg and 0.06 kg, respectively, 0.95 kg of an aromatic polyester-polyorganosiloxane block copolymer (S-5) (number average molecular weight: 47000) was obtained.

Synthetic Example 6

By the same method as in Synthetic Example 1, except that 0.5 kg of a polydimethylsiloxane having a diol group at each end (number average molecular weight: 1800) of the formula shown in Synthetic Example 1 was used in place of the polydimethylsiloxane used in Synthetic Example 1 and that each of the amounts of terephthalic acid chloride and isophthalic acid chloride was changed to 0.17 kg, 0.95 kg of an aromatic polyester-polyorganosiloxane block copolymer (S-6) (number average molecular weight: 50000) was obtained.

Synthetic Example 7

By the same method as in Synthetic Example 1, except that 0.5 kg a polydimethylsiloxane having a diol group at each end (number average molecular weight: 5600) of the formula shown in Synthetic Example 1 was used in place of the polydimethylsiloxane used in Synthetic Example 1 and that each of the amounts of terephthalic acid chloride and isophthalic acid chloride was changed to 0.15 kg, 0.95 kg of an aromatic polyester-polyorganosiloxane block copolymer (S-7) (number average molecular weight: 45000) was obtained.

Synthetic Example 8

Into a reactor equipped with a stirrer were charged 0.1 kg of the same polydimethylsiloxane having a diol group at each end (number average molecular weight: 3200) as used in Synthetic Example 1. 0.034 kg of p-acetoxybenzoic acid, 0.032 kg of 1-acetoxy-6-naphthoic acid and 0.006 kg of terephthalic acid, and 50 ppm of tetrabutyl titanate was added as a catalyst. The resulting mixture was heated under nitrogen at 230° C. for 3 hours and then heated to 300° C. over a period of 30 minutes, and the pressure was reduced to 15 mmHg. After heating at 300° C. at 15 mmHg for 1 hour, the pressure was reduced to 0.5 mmHg and the mixture was heated for another 1 hour. The reaction product was extracted from the reaction mixture to obtain an aromatic polyester-polyorganosiloxane block copolymer (S-8).

Synthetic Example 9

By the same method as in Synthetic Example 8, except that the amount of p-acetoxybenzoic acid was changed to 0.033 kg and that 0.042 kg of 2,6-naphthalenedicarboxylic acid and 0.049 kg of 2,6-diacetoxynaphthalene were used in place of 1-acetoxy-6-naphthoic acid, an aromatic polyester-polyorganosiloxane block copolymer (S-9) was obtained.

Synthetic Example 10

By the same method as in Synthetic Example 8, except that the amount of p-acetoxybenzoic acid was changed to 0.033 kg and that 0.042 kg of 2,6-naphthalenedicarboxylic acid, 0.039 kg of resorcinol diacetate and 0.006 kg of isophthalic acid were used in place of 1-acetoxy-6-naphthoic acid and terephthalic acid, an aromatic polyester-polyorganosiloxane block copolymer (S-10) was obtained.

Synthetic Example 11

Into a reactor equipped with a high-speed stirrer were charged 20 liters of water, 0.35 kg of sodium hydroxide and 0.94 kg of bisphenol A to obtain a solution. Subsequently, in the reactor was placed a solution separately prepared by dissolving 0.51 kg of terephthalic acid chloride, 0.51 kg of isophthalic acid chloride and 1.79 kg of a polydimethylsiloxane having a propylamine group at each end (number average molecular weight: 2000) represented by the formula:

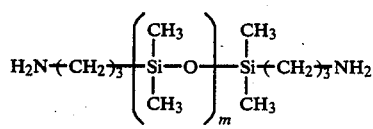

(wherein m is an integer of 10 or more) in 14 liters of water, and the reaction was carried out at 15° C. for 4 hours.

After completion of the reaction, the organic layer was washed with diluted hydrochloric acid and water, followed by reprecipitation with methanol. The polymer precipitated was dried in vacuo at 80° C. for 12 hours to obtain 3.2 kg of an aromatic polyester-polyorganosiloxane block copolymer (S-11). The number average molecular weight of the block copolymer was 36000.

Synthetic Examples 12 and 13

By the same method as in Synthetic Example 11, except that sodium hydroxide, bisphenol A, terephthalic acid chloride, isophthalic acid chloride, and the polydimethylsiloxane having a propylamine group at each end (number average molecular weight: 2000) of the formula shown in Synthetic Example 11 were used in each set of their respective amounts shown below, 2.3 kg of an aromatic polyester-polyorganosiloxane block copolymer (S-12) and 2.6 kg of an aromatic polyester-polyorganosiloxane block copolymer (S-13) were obtained. The number average molecular weights of the block copolymers S-12 and S-13 were 33000 and 41000, respectively.

|  | S-12 | S-13 |
|---|---|---|
| Sodium hydroxide (kg) | 0.45 | 0.14 |
| Bisphenol A (kg) | 1.05 | 0.33 |
| Terephthalic acid chloride (kg) | 0.51 | 0.26 |
| Isophthalic acid chloride (kg) | 0.51 | 0.26 |
| Polydimethylsiloxane having a propylamine group at each end (kg) | 0.77 | 2.09 |

Synthetic Example 14

Into a reactor equipped with a stirrer were charged 0.388 kg of dimethyl terephthalate, 0.36 kg of 1,4-butanediol and 0.44 kg of a polydimethylsiloxane having a propanol group at each end (number average molecular weight: 1800) represented by the formula:

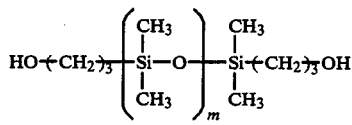

wherein m is an integer of 10 or more, and 10 ml of a 1% solution of butyl titanate [Ti(OC$_4$H$_9$)$_4$] in butanol was added as a catalyst. The resulting mixture was heated from 150° C. to 250° C. with stirring under nitrogen over a period of 4 hours. Subsequently, the pressure was gradually reduced to 0.5 mmHg at 250° C. over a period of 2 hours. The mixture was continuously stirred at 250° C. at 0.5 mmHg for another 3 hours, after which the reaction was terminated to obtain 0.85 kg of an aromatic polyester-polyorganosiloxane block copolymer (S-14).

The number average molecular weight of the block copolymer was 31000.

Examples 1 to 35

Commercially available polyether imide resin (A) (ULTEM ® 1000, mfd. by General Electric Co.) and each of the various aromatic polyester-polyorganosiloxane block copolymers (B) (S-1 to S-14) obtained in Synthetic Examples 1 to 14 were mixed in an extruder in each ratio shown in Table 1, and shaped into pellets under usual conditions. Some of the pellets were injection-molded into test pieces having a size predetermined for each test. Using the two kinds of the test pieces thus obtained, Izod impact strength and thermal deformation temperature were measured. The results obtained are shown in Table 1.

Comparative Example 1

The same commercially available polyether imide resin as used in Example 1 was extruded into pellets and then injection-molded under the same conditions as in Example 1 to obtain test pieces. Evaluations were carried out in the same manner as in Example 1. The results obtained are shown in Table 1.

Comparative Example 2

A composition was prepared in the same manner as in Example 1, except that the same commercially available polyether imide resin as used in Example 1 and an aromatic polyester obtained by the synthetic method described below were used in the ratio shown in Table 1. The composition was extruded into pellets and then injection-molded under the same conditions as in Example 1 to obtain test pieces. Evaluations were carried out in the same manner as in Example 1. The results obtained are shown in Table 1.

Synthetic method of the aromatic polyester:

By the same method as in Synthetic Example 1, except that the amounts of bisphenol A, terephthalic acid chloride, isophthalic acid chloride and pyridine were changed to 0.5 kg, 0.22 kg, 0.22 kg and 0.39 kg, respectively and that the polydimethylsiloxane having a diol group at each end was omitted, 0.95 kg of the aromatic polyester was obtained. The number average molecular weight of the polyester was 25000.

Comparative Example 3

A composition was prepared in the same manner as in Example 1, except that the same commercially available polyether imide resin as used in Example 1 and commercially available polycarbonate-polydimethylsiloxane block copolymer (LR 3320, mfd. by General Electric Co.) were used in the ratio shown in Table 1. The composition was extruded into pellets and injection-molded under the same conditions as in Example 1 to obtain test pieces. Evaluations were carried out in the same manner as in Example 1. The results obtained are shown in Table 1.

TABLE 1

|  | Aromatic polyester-polyorganosiloxane block copolymer (B) | Ratio of polyether imide resin (A) to block copolymer (B) - (A/B) (by weight) | Izod impact strength (kg-cm/cm) | Thermal deformation temp. (°C.) |
|---|---|---|---|---|
| Example 1 | S-1 | 80/20 | 35 | 190 |
| Example 2 | " | 50/50 | 52 | 150 |
| Example 3 | " | 20/80 | 90 | 102 |
| Example 4 | S-2 | 80/20 | 30 | 194 |

TABLE 1-continued

| | Aromatic polyester-polyorganosiloxane block copolymer (B) | Ratio of polyether imide resin (A) to block copolymer (B) - (A/B) (by weight) | Izod impact strength (kg-cm/cm) | Thermal deformation temp. (°C.) |
|---|---|---|---|---|
| Example 5 | " | 50/50 | 51 | 153 |
| Example 6 | " | 20/80 | 79 | 110 |
| Example 7 | S-3 | 80/20 | 23 | 195 |
| Example 8 | " | 50/50 | 44 | 160 |
| Example 9 | " | 20/80 | 71 | 112 |
| Example 10 | S-4 | 80/20 | 40 | 191 |
| Example 11 | " | 50/50 | 62 | 144 |
| Example 12 | " | 20/80 | 95 | 100 |
| Example 13 | S-5 | 80/20 | 46 | 190 |
| Example 14 | " | 50/50 | 70 | 142 |
| Example 15 | " | 20/80 | 102 | 96 |
| Example 16 | S-6 | 80/20 | 21 | 194 |
| Example 17 | S-6 | 50/50 | 40 | 150 |
| Example 18 | " | 20/80 | 75 | 100 |
| Example 19 | S-7 | 80/20 | 39 | 191 |
| Example 20 | " | 50/50 | 71 | 152 |
| Example 21 | " | 20/80 | 115 | 105 |
| Example 22 | S-8 | 80/20 | 30 | 195 |
| Example 23 | " | 50/50 | 51 | 160 |
| Example 24 | " | 20/80 | 85 | 115 |
| Example 25 | S-9 | 80/20 | 32 | 196 |
| Example 26 | " | 50/50 | 50 | 152 |
| Example 27 | " | 20/80 | 88 | 110 |
| Example 28 | S-10 | 80/20 | 29 | 195 |
| Example 29 | " | 50/50 | 53 | 155 |
| Example 30 | " | 20/80 | 86 | 110 |
| Example 31 | S-11 | 80/20 | 21 | 194 |
| Example 32 | " | 60/40 | 39 | 152 |
| Example 33 | S-12 | 80/20 | 15 | 195 |
| Example 34 | S-13 | " | 28 | 190 |
| Example 35 | S-14 | " | 22 | 188 |
| Comparative Example 1 | — | 100/0 | 2 | 200 |
| Comparative Example 2 | Aromatic polyester | 80/20 | 3 | 195 |
| Comparative Example 3 | Polycarbonate-polydimethylsiloxane block copolymer | " | 4 | 172 |

What is claimed is:

1. A thermoplastic resin composition, comprising:
(A) a polyether imide resin, consisting of recurring units having the formula (1)

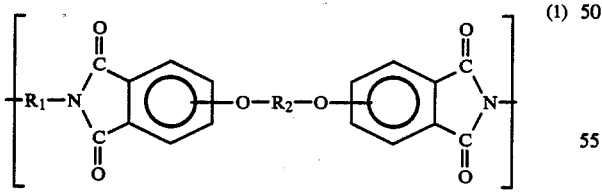

wherein $R_1$ and $R_2$ are, independently, a substituted or unsubstituted phenylene group, or a group having the formula

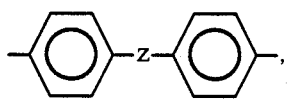

wherein Z is an oxygen atom, a sulfur atom,

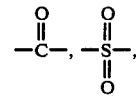

or an alkylene group having 5 or less carbon atoms; and (B) an aromatic polyester-polyorganosiloxane block copolymer, containing at least one polymer segment, comprising, as its main constituent, at least one segment selected from the group consisting of: (i) an aromatic polyester comprising monomer units derived from at least one aromatic dicarboxylic acid and at least one dihydric phenol; (ii) an aromatic polyester comprising monomer units derived from at least one aromatic dicarboxylic acid and at least one diol selected from lower aliphatic diols and alicyclic diols; and (iii) an aromatic polyester comprising monomer units derived from an aromatic hydroxycarboxylic acid; and polyorganosiloxane segments having the formula (2)

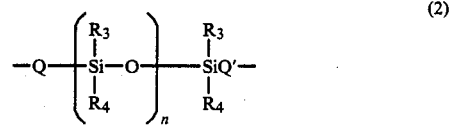

wherein $R_3$ and $R_4$ are, independently, methyl or phenyl groups, Q is an oxygen atom,

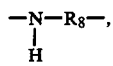

or —O—$R_9$— in which each of $R_8$ and $R_9$ is a lower alkylene group or a lower alkylene ether group; and Q' is an oxygen atom,

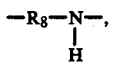

or —$R_9$—O—, wherein $R_8$ and $R_9$ are as defined above, and n is an integer of 10 or more, and wherein the weight ratio of (A) to (B) is 1/9 to 9/1.

2. A thermoplastic resin composition according to claim 1, wherein the polyether imide resin (A) consists of recurring units represented by the formula:

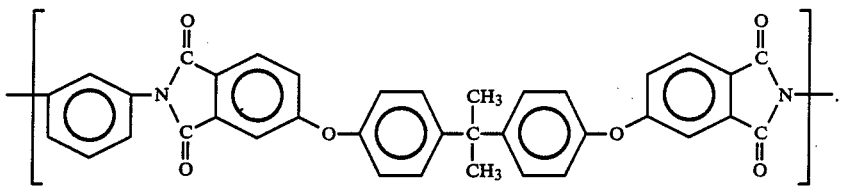

3. A thermoplastic resin composition according to claim 1, wherein in the aromatic polyester-polyorganosiloxane block copolymer (B), the aromatic dicarboxylic acid(s) constituting the aromatic polyester is represented by the formula:

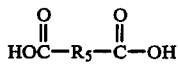

wherein $R_5$ is a substituted or unsubstituted phenylene group, and the dihydric phenol(s) constituting the aromatic polyester is represented by the formula:

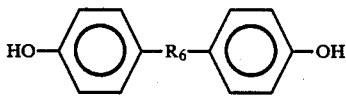

wherein $R_6$ is an oxygen atom, a sulfur atom,

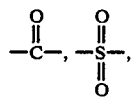

or an alkylene group having 5 or less carbon atoms.

4. A thermoplastic resin composition according to claim 3, wherein in the aromatic polyester-polyorganosiloxane block copolymer (B), the aromatic dicarboxylic acid(s) constituting the aromatic polyester is terephthalic acid and/or isophthalic acid, and the dihydric phenol(s) constituting the aromatic polyester is 2,2-bis(4-hydroxyphenyl)propane.

5. A thermoplastic resin composition according to claim 1, wherein in the aromatic polyester-polyorganosiloxane block copolymer (B), the aromatic dicarboxylic acid(s) constituting the aromatic polyester is represented by the formula:

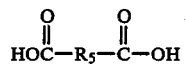

wherein $R_5$ is a substituted or unsubstituted phenylene group, and the lower aliphatic diol(s) or the alicyclic diol(s) constituting the aromatic polyester is represented by the formula:

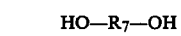

wherein $R_7$ is a lower alkylene group or an alicyclic alkylene group.

6. A thermoplastic resin composition according to claim 5, wherein the aromatic dicarboxylic acid(s) constituting the aromatic polyester is terephthalic acid and/or isophthalic acid, and the lower aliphatic diol(s) constituting the aromatic polyester is ethylene glycol and/or 1,4-butanediol and/or cyclohexanedimethanol.

7. A thermoplastic resin composition according to claim 1, wherein in the aromatic polyester-polyorganosiloxane block copolymer (B), the aromatic polyester is a polyester which exhibits a behavior of liquid crystal.

8. A thermoplastic resin composition according to claim 7, wherein in the aromatic polyester-polyorganosiloxane block copolymer (B), the aromatic polyester is a copolymer of p-hydroxybenzoic acid and 6-hydroxy-2-naphthoic acid.

9. A thermoplastic resin composition according to claim 7, wherein in the aromatic polyester-polyorganosiloxane block copolymer (B), the aromatic polyester is a copolymer of p-hydroxybenzoic acid, 2,6-naphthalenedicarboxylic acid and 2,6naphthalenediol.

10. A thermoplastic resin composition according to claim 7, wherein in the aromatic polyester-polyorganosiloxane block copolymer (B), the aromatic polyester is a copolymer of p-hydroxybenzoic acid, 2,6-naphthalenedicarboxylic acid, resorcinol and isophthalic acid.

11. A thermoplastic resin composition according to claim 1, wherein the aromatic polyester-polyorganosiloxane block copolymer (B), the polyorganosiloxane is a polydimethylsiloxane.

* * * * *